US011983971B2

(12) United States Patent
Churchill

(10) Patent No.: US 11,983,971 B2
(45) Date of Patent: *May 14, 2024

(54) SYSTEMS AND METHODS FOR BATTERY MANAGEMENT FOR A VEHICLE

(71) Applicant: BETA AIR, LLC, South Burlington, VT (US)

(72) Inventor: David Churchill, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,275

(22) Filed: Jun. 30, 2022

(65) Prior Publication Data
US 2023/0138942 A1 May 4, 2023

Related U.S. Application Data

(63) Continuation of application No. 17/515,433, filed on Oct. 30, 2021, now Pat. No. 11,443,569.

(51) Int. Cl.
| | |
|---|---|
| *G07C 5/08* | (2006.01) |
| *B60L 58/10* | (2019.01) |
| *B64D 27/24* | (2006.01) |
| *G05B 13/02* | (2006.01) |
| *G07C 5/00* | (2006.01) |
| *H01M 10/42* | (2006.01) |
| *H01M 10/48* | (2006.01) |

(52) U.S. Cl.
CPC ............ *G07C 5/0833* (2013.01); *B60L 58/10* (2019.02); *G05B 13/0265* (2013.01); *G07C 5/008* (2013.01); *G07C 5/0825* (2013.01); *H01M 10/425* (2013.01); *H01M 10/488* (2013.01); *B60L 2200/10* (2013.01); *B64D 27/24* (2013.01); *H01M 2010/4271* (2013.01); *H01M 2010/4278* (2013.01); *H01M 2220/20* (2013.01)

(58) Field of Classification Search
CPC .... G07C 5/0833; G07C 5/008; G07C 5/0825; G05B 13/0265; H01M 10/425; H01M 10/488; H01M 2010/4271; H01M 2010/4278; H01M 2220/20; B64D 27/24
See application file for complete search history.

(56) References Cited

U.S. PATENT DOCUMENTS

| | | | | |
|---|---|---|---|---|
| 7,468,681 B2 * | 12/2008 | Bootes | ................... | B63B 49/00 340/815.45 |
| 7,928,735 B2 * | 4/2011 | Huang | ................... | B60L 58/15 324/426 |

(Continued)

*Primary Examiner* — Luis A Martinez Borrero
(74) *Attorney, Agent, or Firm* — Hoffman Warnick LLC

(57) ABSTRACT

A system for battery management for a vehicle that includes at least a battery coupled to the vehicle, at least a sensor coupled to the battery, the sensor configured to detect an internal state datum of the battery, and transmit the internal state datum to a computing device, a computing device, the computing device configured to receive the internal state datum from the at least a sensor, generate an alert datum as a function of the internal state datum and an alert threshold, transmit the alert datum to a remote device, and a remote device communicatively connected to the vehicle, the remote device is configured to, receive the alert datum from the computing device, and display the alert datum.

20 Claims, 7 Drawing Sheets

(56) References Cited

U.S. PATENT DOCUMENTS

| | | | |
|---|---|---|---|
| 9,746,524 B2* | 8/2017 | Petrucelli | H01M 10/486 |
| 9,864,372 B2* | 1/2018 | Chen | H04L 67/125 |
| 10,014,561 B2* | 7/2018 | Sood | G01N 29/07 |
| 10,067,192 B2* | 9/2018 | Petrucelli | G01K 13/00 |
| 10,322,824 B1* | 6/2019 | Demont | B64F 5/60 |
| 10,673,101 B2* | 6/2020 | Sood | G01N 29/22 |
| 10,854,866 B2* | 12/2020 | Demont | H01M 10/625 |
| 10,960,785 B2* | 3/2021 | Villanueva | B64U 20/96 |
| 10,962,599 B2* | 3/2021 | Petrucelli | G01R 31/371 |
| 10,978,883 B2* | 4/2021 | Werner | H02J 7/0013 |
| 11,063,323 B2* | 7/2021 | Demont | B60L 50/64 |
| 11,072,258 B2* | 7/2021 | Kumar | B60L 50/60 |
| 11,148,819 B2* | 10/2021 | Demont | H01M 10/486 |
| 11,433,779 B2* | 9/2022 | Lohe | B60L 3/0038 |
| 11,443,569 B1* | 9/2022 | Churchill | G05B 13/0265 |
| 11,501,583 B2* | 11/2022 | Chen | H01M 10/48 |
| 11,585,861 B2* | 2/2023 | Mikolajczak | G01B 9/02 |
| 11,634,232 B1* | 4/2023 | Wiegman | B64C 29/0016 244/53 R |
| 11,639,230 B1* | 5/2023 | Wiegman | B60L 50/61 244/55 |
| 2015/0336671 A1* | 11/2015 | Winn | G05D 1/0094 701/3 |
| 2016/0071339 A1* | 3/2016 | Yuasa | G01R 31/382 340/636.16 |
| 2016/0077159 A1* | 3/2016 | Petrucelli | G01R 31/382 324/426 |
| 2016/0116548 A1* | 4/2016 | Ghantous | H01M 10/425 702/63 |
| 2016/0380317 A1* | 12/2016 | Lin | H01M 10/4285 324/427 |
| 2017/0098872 A1* | 4/2017 | Sood | H01M 10/482 |
| 2017/0182906 A1* | 6/2017 | Park | B60L 58/12 |
| 2017/0261473 A1* | 9/2017 | Sung | G01N 29/4481 |
| 2017/0356963 A1* | 12/2017 | Petrucelli | G01K 13/00 |
| 2018/0102576 A1* | 4/2018 | Yamamoto | H01M 10/6556 |
| 2018/0287219 A1* | 10/2018 | Sood | H01M 10/0525 |
| 2018/0372802 A1* | 12/2018 | Petrucelli | G01K 13/00 |
| 2018/0375371 A1* | 12/2018 | Duhaut | B60L 58/10 |
| 2019/0176639 A1* | 6/2019 | Kumar | B60L 3/0046 |
| 2019/0181403 A1* | 6/2019 | Gu | H01M 50/30 |
| 2019/0187724 A1* | 6/2019 | Li | B64D 47/08 |
| 2019/0207274 A1* | 7/2019 | Ladpli | H01M 10/48 |
| 2019/0245252 A1* | 8/2019 | Mäki | G01R 31/392 |
| 2019/0329669 A1* | 10/2019 | Soeda | G07C 5/0825 |
| 2019/0339334 A1* | 11/2019 | Mikolajczak | G01B 9/02 |
| 2019/0392320 A1* | 12/2019 | Kim | B60L 58/12 |
| 2020/0005564 A1* | 1/2020 | Coburn | B60L 58/12 |
| 2020/0009986 A1* | 1/2020 | Thrun | B64C 39/026 |
| 2020/0066070 A1* | 2/2020 | Wells | G07C 5/0833 |
| 2020/0088796 A1* | 3/2020 | Werner | G01R 31/3835 |
| 2020/0110453 A1* | 4/2020 | Wells | B60L 53/60 |
| 2020/0122577 A1* | 4/2020 | Kubo | G07C 5/0825 |
| 2020/0280108 A1* | 9/2020 | Tomar | H01M 50/574 |
| 2020/0339010 A1* | 10/2020 | Villanueva | B64D 27/24 |
| 2020/0357197 A1* | 11/2020 | Chen | H01M 10/48 |
| 2020/0363477 A1* | 11/2020 | Biehler | G01R 19/16542 |
| 2021/0066934 A1* | 3/2021 | Sasaki | H02J 7/0063 |
| 2021/0190868 A1* | 6/2021 | Benoit | H01M 10/48 |
| 2021/0197691 A1* | 7/2021 | Stefanopoulou | H01M 10/44 |
| 2021/0231745 A1* | 7/2021 | Nagai | H01M 10/486 |
| 2021/0286017 A1* | 9/2021 | Hom | H02J 7/0048 |
| 2021/0318191 A1* | 10/2021 | Okulov | G06F 1/1694 |
| 2021/0349157 A1* | 11/2021 | Srinivasan | H01M 10/486 |
| 2021/0405104 A1* | 12/2021 | Naderivesal | G01R 31/006 |
| 2022/0037708 A1* | 2/2022 | Lee | G01B 11/18 |
| 2022/0065940 A1* | 3/2022 | Sudarsan | G01R 31/392 |
| 2022/0089291 A1* | 3/2022 | Decker | B64D 31/02 |
| 2022/0106060 A1* | 4/2022 | Morrison | H01M 8/04604 |
| 2022/0109197 A1* | 4/2022 | Glad | H01M 10/058 |
| 2023/0060396 A1* | 3/2023 | Beaston | H01M 50/24 |
| 2023/0097762 A1* | 3/2023 | Mikolajczak | G01B 9/02 429/90 |
| 2023/0136431 A1* | 5/2023 | Wiegman | B60L 3/0084 701/29.2 |

\* cited by examiner

SYSTEMS AND METHODS FOR BATTERY MANAGEMENT FOR A VEHICLE

CROSS-REFERENCE TO RELATED APPLICATIONS

This application is a continuation of Nonprovisional application Ser. No. 17/515,433, filed on Oct. 30, 2021, and entitled "SYSTEMS AND METHODS FOR BATTERY MANAGEMENT FOR A VEHICLE," the entirety of which is incorporated herein by reference.

FIELD OF THE INVENTION

The present invention generally relates to the field of battery management. In particular, the present invention is directed to systems and methods for battery management for a vehicle.

BACKGROUND

A battery failure may damage a vehicle, or in situations such as in an electric aircraft, a battery condition that may cause a thermal runaway may be dangerous to the life if the pilot and passenger. It is desirable to have a system that alerts a user of the vehicle, in the vehicle or a remote user, of the internal state of the battery so precautionary steps can be taken to avoid damage to the battery and vehicle.

SUMMARY OF THE DISCLOSURE

In an aspect, a system for battery management for a vehicle, the system including at least a battery connected to the vehicle and at least a sensor connected to the battery, the sensor configured to detect an internal state datum of the at least a battery. The system further including a computing device, the computing device configured to receive the internal state datum from the at least a sensor, generate an alert datum as a function of the internal state datum and an alert threshold, and transmit the alert datum to a remote device. The system further including a remote device communicatively connected to the vehicle, the remote device is configured to receive the alert datum from the computing device and display the alert datum.

In another aspect, a method for battery management, the method including detecting, by at least a sensor coupled to at least a battery, wherein the at least a battery is connected to a vehicle, an internal state datum of the battery, transmitting, by the at least a sensor, the internal state datum to a computing device, receiving, at a computing device, the internal state datum from the at least a sensor, generating, by the computing device, an alert datum as a function of the internal state datum and an alert threshold, transmitting, by the computing device, the alert datum to a remote device communicatively connected to the vehicle, receiving, by the remote device, the alert datum from the computing device, and displaying, by the remote device, the alert datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for battery managements for a vehicle. In an embodiment, a system that includes at least a battery, at least a sensor configured to detect an internal state datum of the battery and transmit that internal state datum, a computing device that is configured to receive the internal state datum, generate an alert datum based on the internal state datum and an alert threshold and transmit the alert datum to a remote device, which is configured to receive and display the alert datum.

Aspects of the present disclosure can be used to alert a remote fleet operator of the status of the vehicle's battery. Aspects of the present disclosure can also be used to alert a user of the state of the battery and may take precautionary action such as warning the user of an unsafe state of the battery or automatically disconnect from unsafe battery modules as to prevent further damage to the vehicle. This is so, at least in part, because the system generates alert related to the internal, or external, state of the battery based on an alert threshold.

Aspects of the present disclosure can also be used to predict the internal state datum of the near future based on the current internal state and battery usage. Exemplary embodiments illustrating aspects of the present disclosure are described below in the context of several specific examples.

Figure 1:
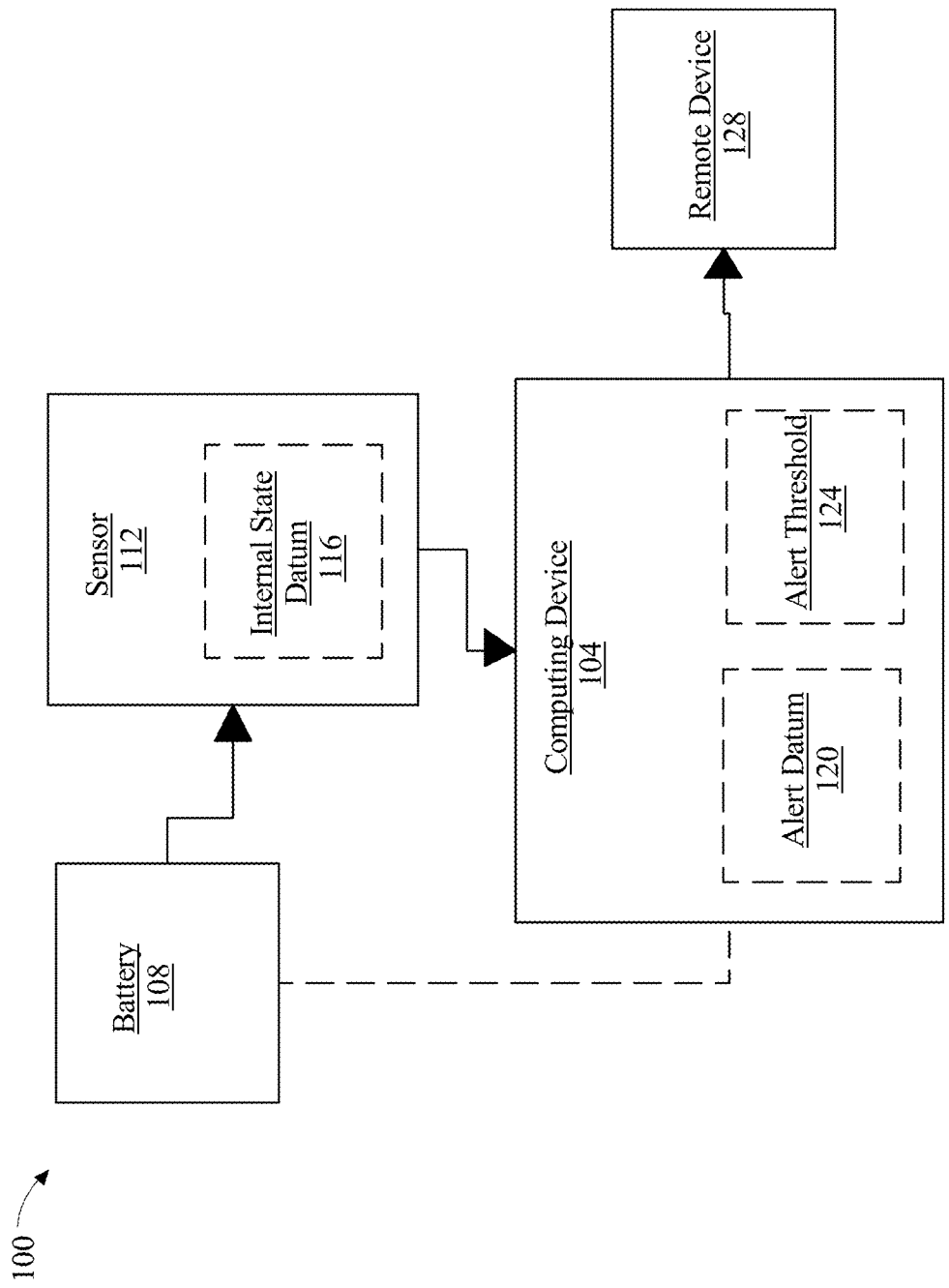
FIG. 1 is a block diagram illustrating an exemplary embodiment of a system for battery management.

Referring now to FIG. 1, an exemplary embodiment of a system 100 for battery management for a vehicle is illustrated. System 100 includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 includes at least a battery 108 coupled to the vehicle. Battery 108 is described in detail further below.

Continuing to refer to FIG. 1, system 100 includes at least a sensor 112 coupled to the battery 108. In some embodiments, at least a sensor 112 may comprise a plurality of sensors in the form of individual sensors or a sensor suite working in tandem or individually. At least a sensor 112 may include a plurality of independent sensors, as described herein, where any number of the described sensors may be used to detect any number of physical or electrical quantities associated with an aircraft power system or an electrical energy storage system. At least a sensor 112 may include a resistance sensor designed and configured to measure the resistance of at least an energy source. At least a sensor 112 may include separate sensors measuring physical or electrical quantities that may be powered by and/or in communication with circuits independently, where each may signal sensor output to a control circuit such as a user graphical interface. In a non-limiting example, there may be four independent sensors housed in and/or on the battery pack 108 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of the computing device 104, flight controller, and/or user to detect phenomenon is maintained and in a non-limiting example, a user alter aircraft usage pursuant to sensor readings.

Additionally, or alternatively, and still referring to FIG. 1, in one embodiment, at least a sensor 112 may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present state of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor may be psychrometer. Moisture sensor may be a hygrometer. Moisture sensor may be configured to act as or include a humidistat. A "humidistat", for the purposes of this disclosure, is a humidity-triggered switch, often used to control another electronic device. Moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1, at least a sensor 112 may include electrical sensors. Electrical sensors may be configured to measure voltage across a component, electrical current through a component, and resistance of a component. Electrical sensors may include separate sensors to measure each of the previously disclosed electrical characteristics such as voltmeter, ammeter, and ohmmeter, respectively. As disclosed above, at least a sensor may be configured to measure physical and/or electrical phenomena and characteristics of a battery pack, in whole or in part. The at least a senor, in some embodiments, may be further configured to transmit electric signals to a data storage system to be saved. In nonlimiting embodiments, battery electrical phenomena may be continuously measured and stored at an intermediary store location, and then permanently saved by a data storage system at a later time. In some embodiments, at least a sensor 112 may include one or more sensors of the same type used to measure the same electrical phenomena, as to provide redundancy, so in the event one of sensors fails, functionality of system 100 is maintained. In some embodiments, at least a sensor 112 may include different types of sensors measuring the same electric phenomena as to provide redundancy in case of sensor failure. In a nonlimiting example, one sensor continues to measure the battery voltage when another sensor stops working. Measuring electrical parameters may be consistent with any embodiment described in Non-Provisional application Ser. No. 16/598,307 filed on Oct. 10, 2019 and entitled "METHODS AND SYSTEMS FOR ALTERING POWER DURING FLIGHT," Non-Provisional application Ser. No. 16/599,538 filed on Oct. 11, 2019 and entitled "SYSTEMS AND METHODS FOR IN-FLIGHT OPERATIONAL ASSESSMENT," and Non-Provisional application Ser. No. 16/590,496 filed on Oct. 2, 2019 and entitled "SYSTEMS AND METHODS FOR RESTRICTING POWER TO A LOAD TO PREVENT ENGAGING CIRCUIT PROTECTION DEVICE FOR AN AIRCRAFT," all of which are incorporated herein by reference in their entirety.

Alternatively or additionally, and with continued reference to FIG. 1, at least a sensor 112 may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. At least a sensor 112 and/or a control circuit incorporated therein and/or communicatively connected thereto may be configured to adjust charge to one or more battery cells as a function of a charge level and/or a detected parameter. For instance, and without limitation, at least a sensor 112 may be configured to determine that a charge level of a battery cell is high based on a detected voltage level of that battery cell or portion of the battery pack. At least a sensor 112 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. At least a sensor 112 may include digital sensors, analog sensors, or a combination thereof. At least a sensor 112 may include digital-to-analog converters (DAC), analog-to-digital converters (ADC, A/D, A-to-D), a combination thereof, or other signal conditioning components used in transmission of a first plurality of battery pack 108 data to a destination over wireless or wired connection.

With continued reference to FIG. 1, at least a sensor 112 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or at least a sensor 112, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

Additionally, or alternatively, at least a sensor 112 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor, may be configured to detect combustible, flammable, toxic, oxygen depleted, a combination thereof, or another type of gas alone or in combination. The gas sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. At least a sensor 112 may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. At least a sensor may include sensors that are configured to detect non-gaseous byproducts of cell failure including, in non-limiting examples, electrical anomalies as detected by any of the previous disclosed sensors or components.

With continued reference to FIG. 1, at least a sensor 112 may be configured to detect events where voltage nears an upper voltage threshold or lower voltage threshold. The upper voltage threshold may be stored in data storage system for comparison with an instant measurement taken by at least a sensor 112. The upper voltage threshold may be calculated and calibrated based on factors relating to battery cell health, maintenance history, location within battery pack 108, designed application, and type, among others. At least a sensor 112 may measure voltage at an instant, over a period of time, or periodically. At least a sensor 112 may be configured to operate at any of these detection modes, switch between modes, or simultaneously measure in more than one mode. At least a sensor 112 may detect events where voltage nears the lower voltage threshold. The lower voltage threshold may indicate power loss to or from an individual battery cell or portion of the battery pack. At least a sensor 112 may detect events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

With continued reference to FIG. 1, at least a sensor 112 is configured to detect an internal state datum 116 of the battery 108. An "internal state datum," for the purpose of this disclosure, includes any parameters usable to determine an internal state of a battery 108. In an embodiment, internal state datum may include a mechanical degradation of the battery 108, such as battery swell. In an embodiment, internal state datum may include an internal resistance and/or impedance of the battery. In nonlimiting embodiments, generating the remaining useful energy datum includes any methods and or parameters used to determine a state of charge of a battery. In one embodiment, internal state datum may further include other data related to the battery such as temperature.

Still referring to FIG. 1, at least a sensor 112 is configured to transmit the internal state datum 116 to the computing device 104. In an embodiment, at least a sensor 112 may be configured to detect an external state datum of the battery and transmit the external state datum to the computing device 104. "External state datum" refers to conditions outside of the battery pack, such as increasing vibration. In a nonlimiting example, computing device 104 may create an alert related to an increase vibration of the battery pack 108 that may damage the battery 108.

Continuing to refer to FIG. 1, computing device 104 is configured to receive the internal state datum 116 from the at least a sensor 112. In a nonlimiting example, at least a sensor 112 transmit the internal state datum as a signal through a wired connection.

Still referring to FIG. 1, computing device is configured to generate an alert datum 120 as a function of the internal state datum 116 and an alert threshold 124. In an embodiment, computing device 104 may be further configured to generate alert threshold 124. In embodiments, generating alert threshold 124 may include selecting a training set as a function of internal state datum 116, where the internal state datum 116 is correlated to an element of model data, and generating using a machine-learning process, the alert threshold based on the internal state datum and the selected training set. In an embodiment, alert datum 120 may be further configured to include an audio alert datum. In an embodiment, alert datum 120 may be further configured to include a tactile alert datum. "Alert threshold" refers to a set limit for an internal state datum of a battery. In embodiments, alert threshold 124 may be pre-set. In an embodiment, alert threshold 124 is set by the computing device 104. In a nonlimiting example, computing device 104 may set a limit for a internal state datum that is the limit before a thermal runaway occurs. In embodiments, alter threshold may be set at multiple levels of threshold. In nonlimiting examples alert may have a CAUTION, SEVERE, and EXTREME level of alert for an internal state datum. In a nonlimiting example, alert threshold 124 may have a lower level that warns a user to land an aircraft before a thermal runaway may occur, and another level that warns user that thermal runaway is imminent. In a further example, alert threshold may have a higher level that warns a user to eject from the vehicle due to unsafe condition of the battery 108.

Additionally, or alternatively, and still referring to FIG. 1, in embodiments, computing device 104 may be further configured to generate a predicted state datum as a function of the internal state datum 116. In an embodiment, generating the predicted state datum includes selecting a training set as a function of the internal state datum 116, where the internal state datum is correlated to an element of model data, and generating using a machine-learning process, the predicted state datum based on the internal state datum 116 and the selected training set. In an embodiment, computing device 104 may be configured to generate a command datum as a function of the internal state datum and the alert datum. In embodiments, machine-learning process may be trained using training data. "Training data" may include battery internal state datum 116 correlated to rate of change to that internal state datum 116. In an embodiment, training data may include past correlations of internal state datum and rate of change for the internal state datum 116 for the same aircraft or may include past correlations for other electric aircrafts. In some embodiment, training data may be stored in a data store system coupled to the electric aircraft. In some embodiments, data store system may be a remote database communicatively connected to system 100. In a nonlimiting example, electric aircraft includes a database containing training data that is updated against a remote database when it becomes communicatively connected to the remote database, or at preset time intervals. In some embodiments, system 100 may be configured to update training data database whenever the system 100 generates a useful energy remaining datum. In an embodiment, system 100 may be configured to correlate data whenever it generates an alert datum 120. In some embodiment, system 100 may further be configured to store correlated data in a local data store system. In some embodiments, system 100 may further be configured to update training data database with correlated data. In some embodiments, battery model and/or machine learning model may be trained as a function of the training data. The battery model and machine learning model, and training those models, are consistent with the machine learning model, and neural network, described further below.

Additionally, or alternatively, and continuing to refer to FIG. 1, in embodiments, computing device 104 may be configured to generate a command datum as a function of the internal datum and the alert datum. In an embodiment, computing device 104 may be configured to transmit the command datum to an at least a flight component. "Command datum" may include any data describing an adjustment to at least a flight component in an electric aircraft. Command datum 120 may indicate a command to change the heading or trim of an electric aircraft. Command datum 120 may further include a command to adjust the torque produced by a propulsor in an electric aircraft. Command datum 120 may indicate a command to change an aircraft's pitch, roll, yaw, or throttle. "Flight component" refers to any component coupled to an aircraft. In a nonlimiting example, computing device 104 may decrease power sent to flight components in order to reduce drain on the battery. In another nonlimiting example, computing device 104 may be configured to disconnect from a battery module when alert datum 120 shows a detection of a thermal runaway on that battery module.

Continuing to refer to FIG. 1, computing device 104 is configured to transmit the alert datum 120 to a remote device 128. In an embodiment, computing device 104 is locally connected to the remote device 128. In embodiments, computing device 104 is communicatively connected to the remote device 128. In a nonlimiting example, computing device 104 may transmit the alert datum through wired connection. In another nonlimiting example, computing device 104 may transmit alert datum 120 through a mobile wireless network. Nonlimiting examples of wireless standards used by flight controller 104 may include 1G, 2G, 3G, 4G and 5G. In embodiments, computing device 104 may be configured to transmit the alter datum 120 through a mobile satellite communications and mobile satellite services (MMS). In nonlimiting examples, MMS communication may utilize Geostationary Orbit (GEO) satellites, Medium Earth Orbit (MEO) satellites, Low Earth Orbit (LEO) satellites, and the like.

Still referring to FIG. 1, system 100 includes a remote device 128 communicatively connected to the vehicle, where the remote device 128 is configured to receive the alert datum 120 from the computing device 104. In an embodiment, remote device 128 may be coupled to the vehicle. In nonlimiting examples remote device 128 may include a graphical user interface, multi-function display (MFD), primary display, gauges, graphs, audio cues, visual cues, information on a heads-up display (HUD) or a combination thereof. Remote device 104 may include a display disposed in one or more areas of an aircraft, on a user device remotely located, one or more computing devices, or a combination thereof. Remote device 128 may be disposed in a projection, hologram, or screen within a user's helmet, eyeglasses, contact lens, or a combination thereof. Remote device 128 may be configured to be used by a remote user such as a fleet operator, a remote pilot, a user of a vehicle monitoring the battery remotely. Remote device 128 may include portable devices such as laptops, computer tablets, smartphones, smartwatches, PDAs, and the like. In a nonlimiting example, remote device 128 may be a smartphone operated by an owner of the vehicle monitoring the status of her vehicle remotely. In another nonlimiting example, remote device 128 may be used by a fleet operator to monitor the status of the vehicle remotely.

Additionally, or alternatively, and still referring to FIG. 1, in an embodiment, remote device 128 may be the same as computing device 104. In an embodiment, computing device 104 and remote device 128 are separate devices.

Continuing to refer to FIG. 1, remote device 128 is configured to display the alert datum 120. As a non-limiting example, remote device 128 may include liquid crystal display (LCD), a cathode ray tube (CRT), a plasma display, a light emitting diode (LED) display, an electroluminescent (ELD) display, a quantum dot (QLED) display, and the like thereof in any combination. In an embodiment, remote device 128 may be configured to relay an audio alert datum. In embodiment, remote device 128 may be configured to relay a tactile alert datum. In embodiments, remote device may be configured to display alert datum 120 in visual form simultaneously with a tactile datum and audio datum. In a nonlimiting example, remote device 128 may be a smartphone that display the alert datum while also vibrating and relaying a voice sound describing the alert datum. In another nonlimiting example, alert datum 120 may be relayed to a braille display, where the tactile datum includes description of the alert datum in braille language.

Additionally, or alternatively, and still referring to FIG. 1, remote device 128 may be a first-person-view headset consistent with the disclosure of a first-person-view headset in U.S. patent application Ser. No. 17/373,968 and titled "METHODS AND SYSTEMS FOR A FLY BY VIEW IN AN ELECTRIC AIRCRAFT", which is incorporated herein by reference in its entirety.

Figure 2:
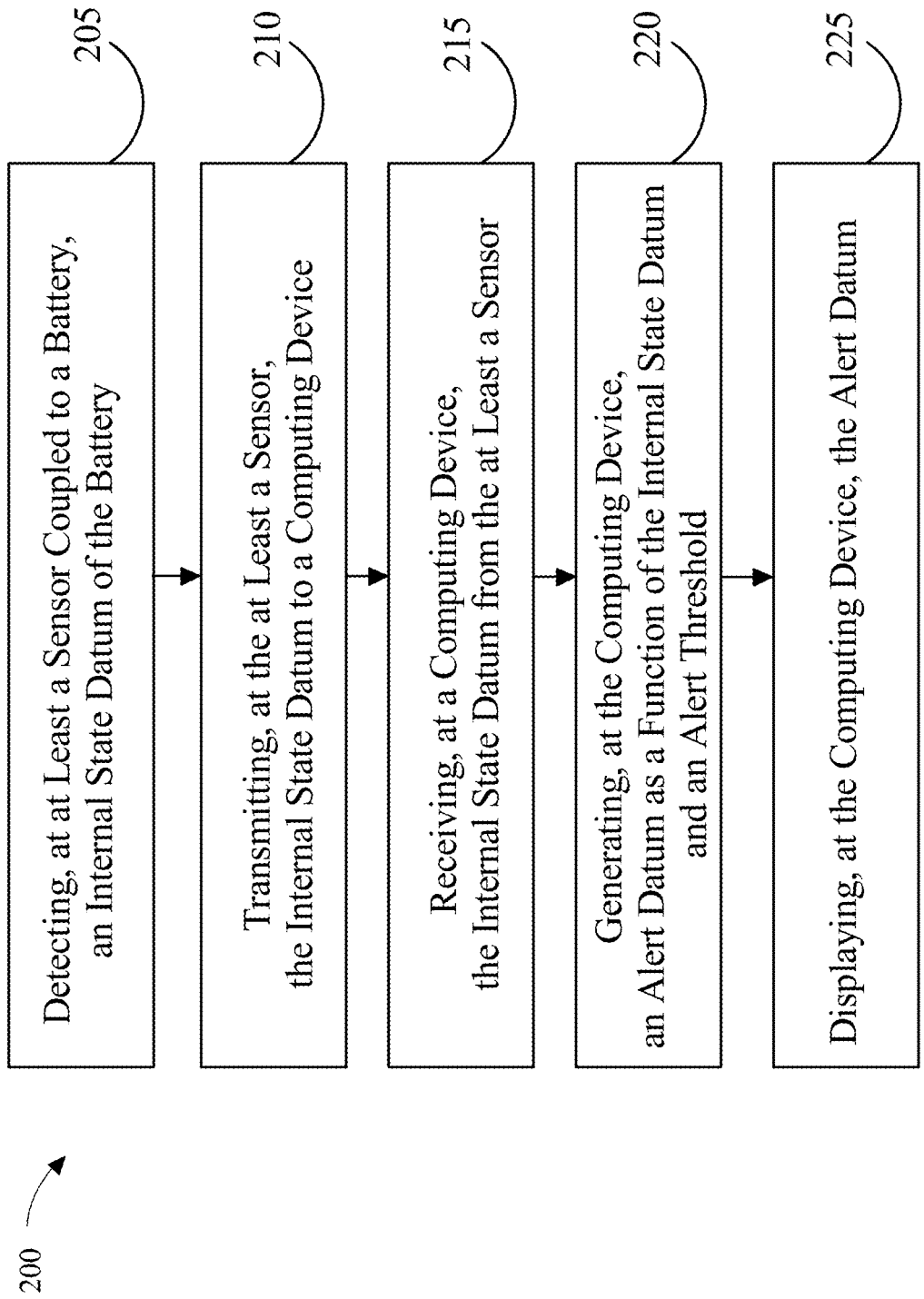
FIG. 2 is a flow diagram illustrating a method of battery management.

Referring now to FIG. 2 an exemplary representation of a method 200 for battery management for a vehicle is illustrated. At step 205, method 200 includes detecting, by at least a sensor 112 coupled to battery 108, internal state datum 116 of the battery 108. In an embodiment, method 200 may further include detecting, by the at least a sensor, an external state datum of the battery, and transmitting, by the at least a sensor, the external state datum to a computing device.

Continuing to refer to FIG. 2, method 200, at step 210, includes transmitting, by the at least a sensor 112, the internal state datum 116 to a computing device 104.

Still referring to FIG. 2, method 200 includes, at step 215, receiving, at a computing device 104, the internal state datum 116 from the at least a sensor 112.

Continuing to refer to FIG. 2, at step 220, method 200 includes generating, by the computing device 104, an alert datum 120 as a function of the internal state datum 116 and an alert threshold 124. In an embodiment, method 200 may include generating, by the computing device 104, the alert threshold. In embodiments, generating the alert threshold 124 may include selecting a training set as a function of the internal state datum 116, where the internal state datum 116 is correlated to an element of model data, and generating using a machine-learning process, the alert threshold 124 based on the internal state datum 116 and the selected training set. In an embodiment, the alert datum may be an audio alert datum. In embodiments, the alert datum may be a tactile alert datum.

Additionally, or alternatively, and still referring to FIG. 2, method 200 may include generating, by the computing device 104, a predicted state datum as a function of the at least a sensor 112. In embodiments, generating the predicted state datum includes selecting a training set as a function of the internal state datum, where the internal state datum is correlated to an element of model data, and generating using a machine-learning process, the predicted state datum based on the internal state datum and the selected training set. In some embodiments, method 200 may include generating, by the computing device 104, a command datum as a function of the internal state datum 116 and the alert datum 120. In an embodiment, method 200 may further include transmitting, by the computing device 104, the command datum to an at least a flight component.

With continued reference to FIG. 2, method 200, at step 225, includes receiving, at a remote device 128, the alert datum 120 from the computing device 104.

Still referring to FIG. 2, at step 230, method 200 includes displaying by the remote device 128, the alert datum 120.

Figure 3:
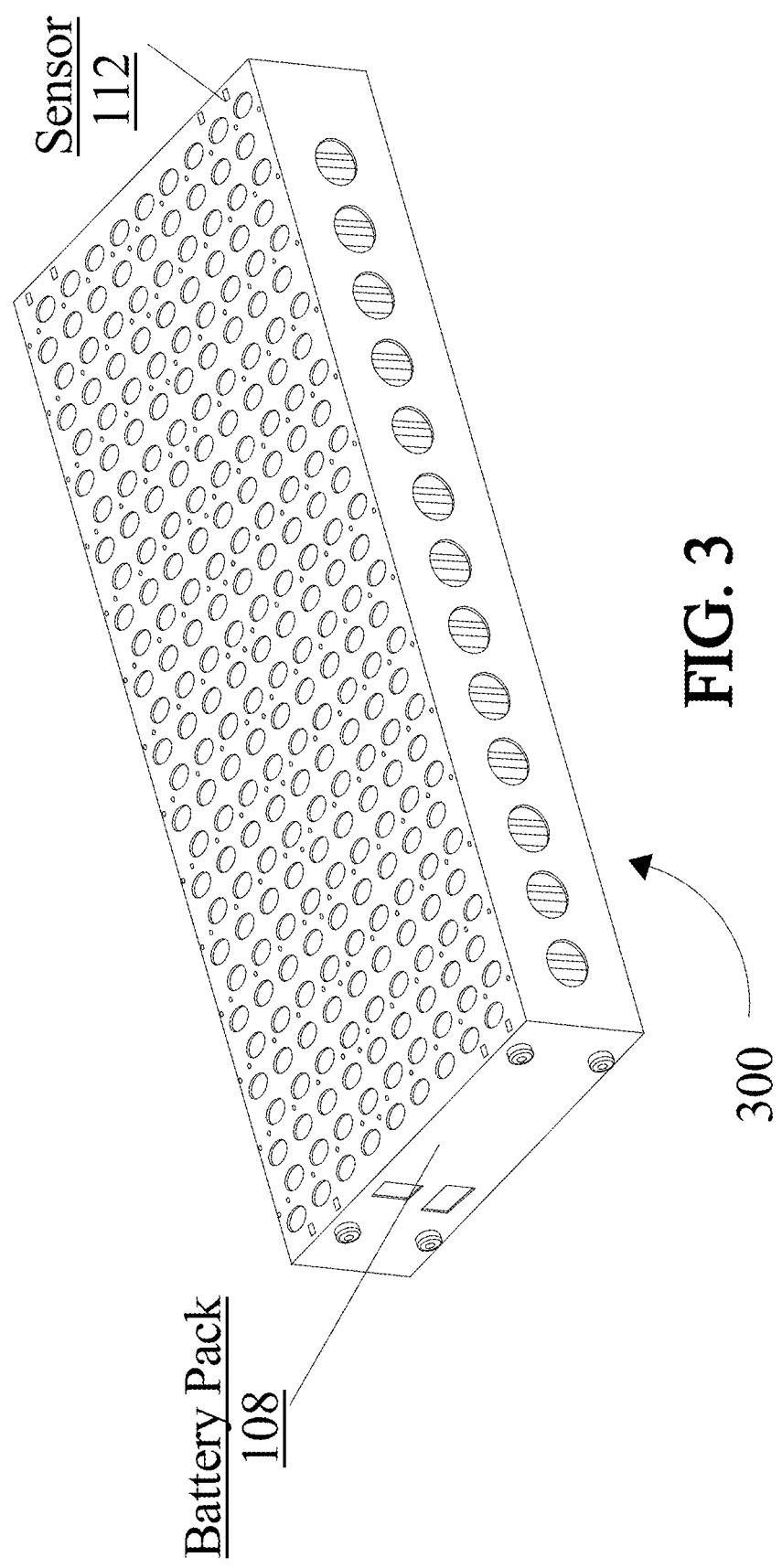
FIG. 3 is a schematic diagram of a battery pack.

Now referring to FIG. 3, an exemplary embodiment of a battery pack is illustrated. Battery pack 108 is a power source that may be configured to store electrical energy in the form of a plurality of battery modules, which themselves include of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 108 include 196 battery cells in series and 18 battery cells in parallel. This is, as someone of ordinary skill in the art would appreciate, is only an example and battery pack 108 may be configured to have a near limitless arrangement of battery cell configurations.

With continued reference to FIG. 3, battery pack 108 may include a plurality of battery modules. The battery modules may be wired together in series and in parallel. Battery pack 108 may include a center sheet which may include a thin barrier. The barrier may include a fuse connecting battery modules on either side of the center sheet. The fuse may be disposed in or on the center sheet and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof.

Still referring to FIG. 3, battery pack 108 may also include a side wall includes a laminate of a plurality of layers configured to thermally insulate the plurality of battery modules from external components of battery pack 108. The side wall layers may include materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery modules from external components of battery pack 108 and the layers of which may include polyvinyl chloride (PVC), glass, asbestos, rigid laminate, varnish, resin, paper, Teflon, rubber, and mechanical lamina. The center sheet may be mechanically coupled to the side wall in any manner described in the entirety of this disclosure or otherwise undisclosed methods, alone or in combination. The side wall may include a feature for alignment and coupling to the center sheet. This feature may include a cutout, slots, holes, bosses, ridges, channels, and/or other undisclosed mechanical features, alone or in combination.

With continued reference to FIG. 3, battery pack 108 may also include an end panel including a plurality of electrical connectors and further configured to fix battery pack 108 in alignment with at least the side wall. The end panel may include a plurality of electrical connectors of a first gender configured to electrically and mechanically couple to electrical connectors of a second gender. The end panel may be configured to convey electrical energy from battery cells to at least a portion of an eVTOL aircraft. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on the side wall. A second end of the end panel may be mechanically coupled to a second end of a second side wall in a similar or the same mechanism.

With continued reference to FIG. 3, at least a sensor 112 may be disposed in or on a portion of battery pack 108 near battery modules or battery cells. Battery pack 108 includes battery management system head unit disposed on a first end of battery pack 108. Battery management system head unit is configured to communicate with a flight controller using a controller area network (CAN). Controller area network includes bus. Bus may include an electrical bus. "Bus", for the purposes of this disclosure and in electrical parlance is any common connection to which any number of loads, which may be connected in parallel, and share a relatively similar voltage may be electrically coupled. Bus may refer to power busses, audio busses, video busses, computing address busses, and/or data busses. Bus may be responsible for conveying electrical energy stored in battery pack 108 to at least a portion of an electric aircraft. Bus may be additionally or alternatively responsible for conveying electrical signals generated by any number of components within battery pack 108 to any destination on or offboard an electric aircraft. Battery management system head unit may comprise wiring or conductive surfaces only in portions required to electrically couple bus to electrical power or necessary circuits to convey that power or signals to their destinations.

Outputs from sensors or any other component present within system may be analog or digital. Onboard or remotely located processors can convert those output signals from sensor suite to a usable form by the destination of those signals. The usable form of output signals from sensors, through processor may be either digital, analog, a combination thereof or an otherwise unstated form. Processing may be configured to trim, offset, or otherwise compensate the outputs of sensor suite. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

With continued reference to FIG. 3, any of the disclosed components or systems, namely battery pack 108, and/or battery cells may incorporate provisions to dissipate heat energy present due to electrical resistance in integral circuit. Battery pack 108 includes one or more battery element modules wired in series and/or parallel. The presence of a voltage difference and associated amperage inevitably will increase heat energy present in and around battery pack 108 as a whole. The presence of heat energy in a power system is potentially dangerous by introducing energy possibly sufficient to damage mechanical, electrical, and/or other systems present in at least a portion of an electric aircraft. Battery pack 108 may include mechanical design elements, one of ordinary skill in the art, may thermodynamically dissipate heat energy away from battery pack 108. The mechanical design may include, but is not limited to, slots, fins, heat sinks, perforations, a combination thereof, or another undisclosed element.

Heat dissipation may include material selection beneficial to move heat energy in a suitable manner for operation of battery pack 108. Certain materials with specific atomic structures and therefore specific elemental or alloyed properties and characteristics may be selected in construction of battery pack 108 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack 108 may include similar or identical features and materials ascribed to battery pack 108 in order to manage the heat energy produced by these systems and components.

According to embodiments, the circuitry disposed within or on battery pack 108 may be shielded from electromagnetic interference. The battery elements and associated circuitry may be shielded by material such as mylar, aluminum, copper a combination thereof, or another suitable material. The battery pack 108 and associated circuitry may include one or more of the aforementioned materials in their inherent construction or additionally added after manufacture for the express purpose of shielding a vulnerable component. The battery pack 108 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies.

Figure 4:
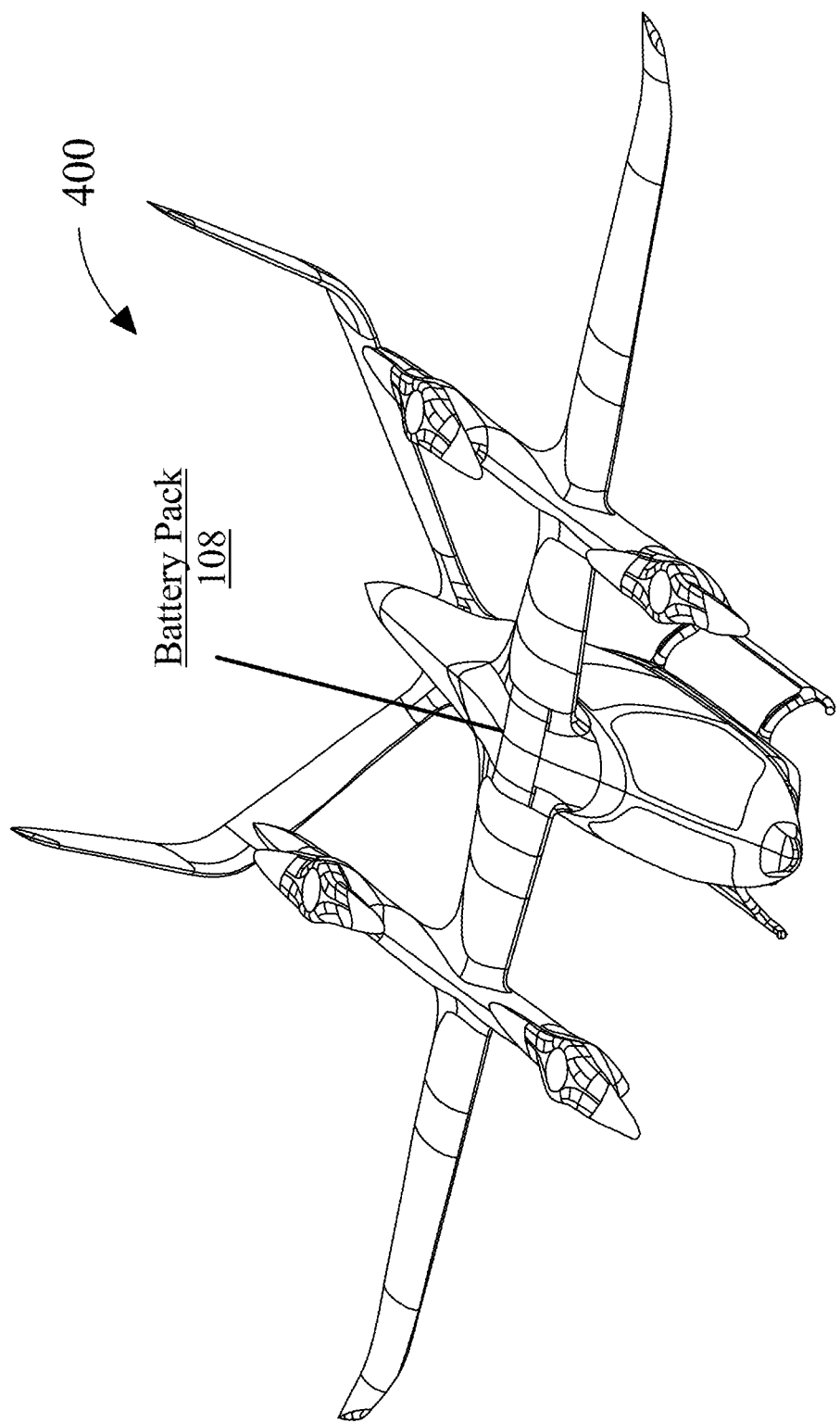
FIG. 4 is a schematic diagram of an exemplary embodiment of an electric aircraft.

Referring now to FIG. 4, an embodiment of an electric aircraft 400 is presented. The electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on an electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of an electric aircraft 400, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

Still referring to FIG. 4, electric aircraft 400 may include at least a sensor 112 coupled to the electric aircraft 400. In one embodiment, electric aircraft 400 may include a flight controller, where the flight controller may be configured to generate an alert datum 120 as function of the internal state datum 116 and an alert threshold 124 for the battery 108 of the electric aircraft 400 as a function of the data transmitted by the at least a sensor 112.

Figure 5:
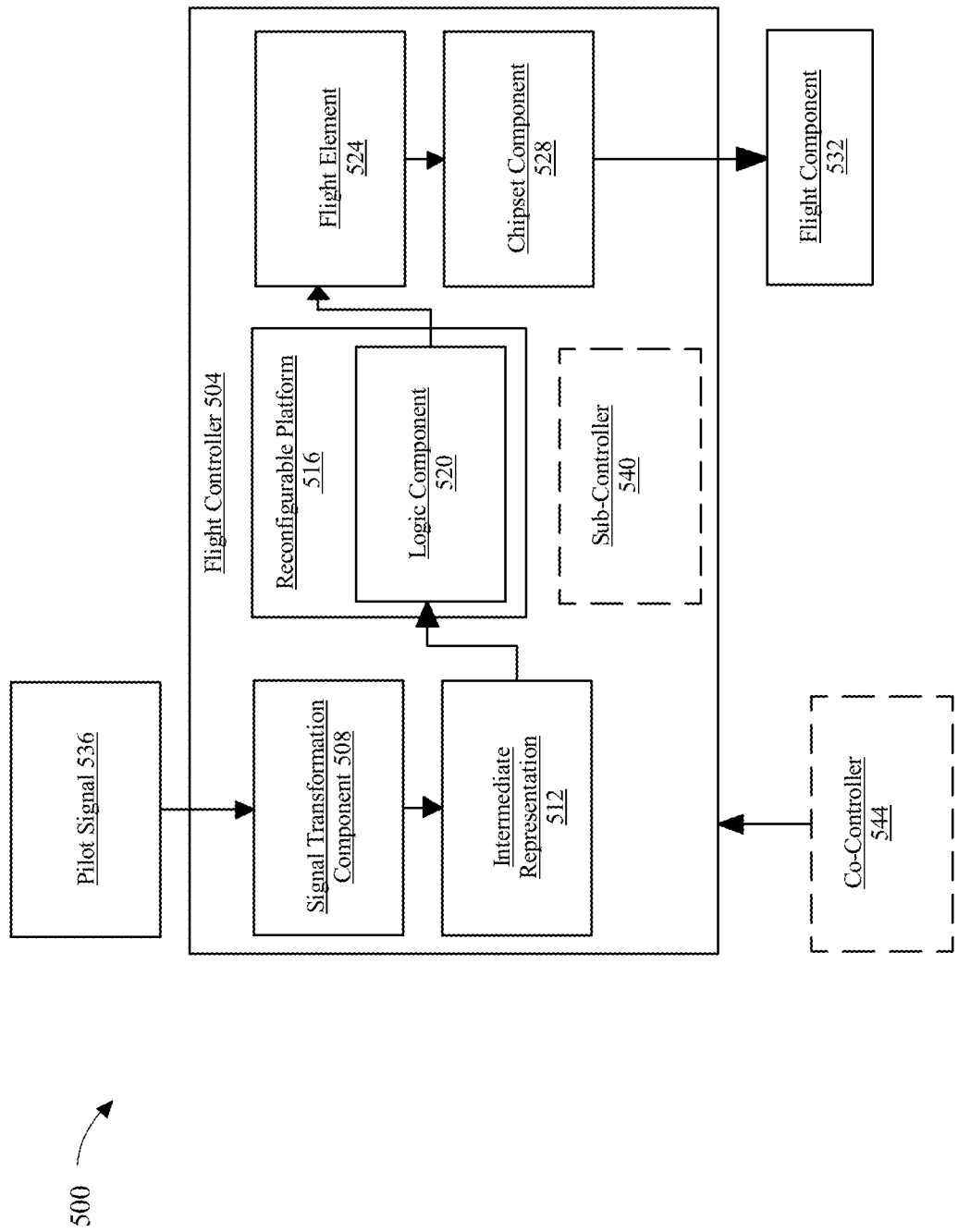
FIG. 5 is a block diagram of a flight controller.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured to generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs xi that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
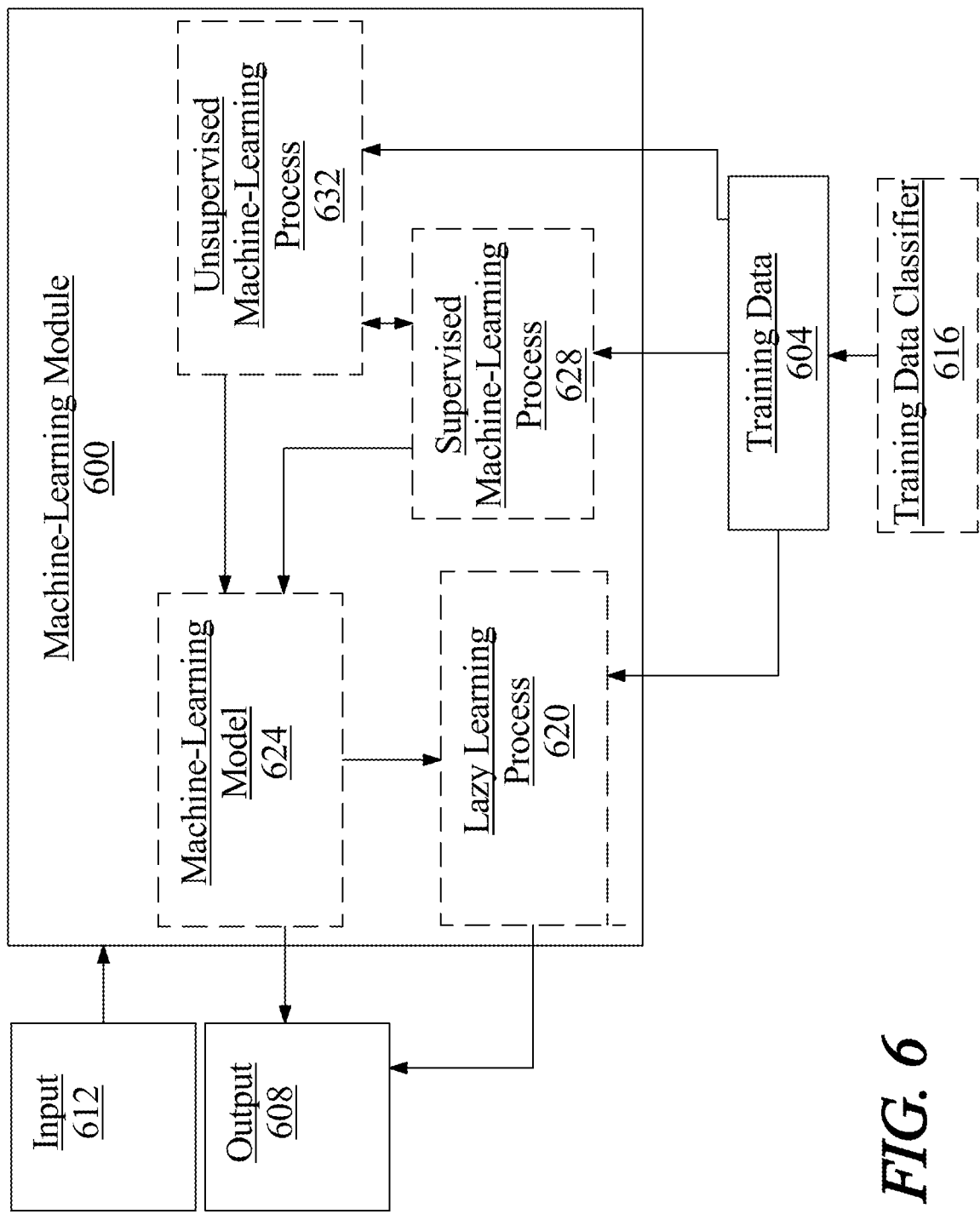
FIG. 6 is a block diagram of an exemplary embodiment of a machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below.

Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
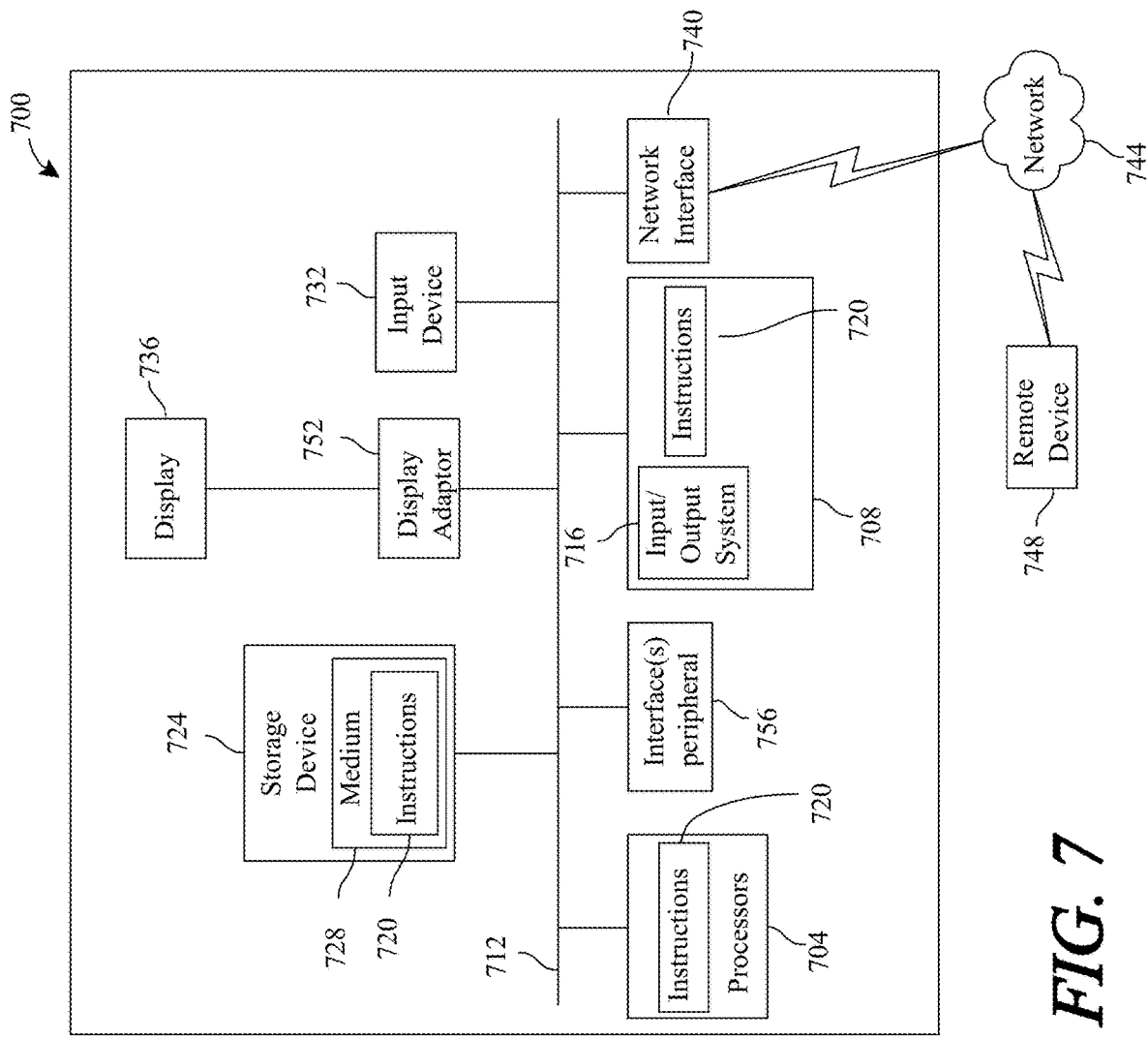
FIG. 7 is a block diagram of an exemplary embodiment of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for battery management for a vehicle, the system comprising:
    at least a battery connected to the vehicle;
    a propulsor powered by the battery;
    at least a sensor connected to the battery, the sensor configured to:
        detect an internal state datum of the at least a battery;
    a computing device, the computing device configured to:
        receive the internal state datum from the at least a sensor;
        generate an alert datum as a function of the internal state datum and at least an alert threshold; and
        transmit the alert datum to a remote device; and
    a remote device communicatively connected to the vehicle, the remote device is configured to:
        receive the alert datum from the computing device; and
        display the alert datum,
    wherein the vehicle comprises an aircraft, and wherein the at least an alert threshold includes a first alert threshold that results in a command datum for reducing an amount of electrical energy demanded by the propulsor, and a second alert threshold wherein the alert datum generated in response to the internal state datum exceeding the second threshold includes alerting a user of a hazardous battery condition and instructing the user to take an emergency corrective action.

2. The system of claim 1, wherein the remote device is configured to display the alert datum to a remote user.

3. The system of claim 1, wherein at least a sensor is further configured to:
    detect an external state datum of the at least a battery, and
    transmit the external state datum to the computing device.

4. The system of claim 3, wherein the external state datum comprises a vibration.

5. The system of claim 1, wherein the computing device is further configured to generate the at least an alert threshold.

6. The system of claim 1, wherein the first alert threshold is generated by:
    selecting a training set as a function of the internal state datum, wherein the internal state datum is correlated to an element of model data; and
    generating, using a machine-learning process, the first alert threshold based on the internal state datum and the selected training set.

7. The system of claim 1, wherein the second alert threshold comprises multiple levels of threshold.

8. The system of claim 1, wherein the computing device is configured to generate the command datum as a function of the internal state datum and the alert datum.

9. The system of claim 1, wherein the remote device is configured to display the alert datum to a remote user.

10. The system of claim 1, wherein the alert datum comprises a tactile datum and an audio datum.

11. The system of claim 1, wherein the internal state datum comprises at least a battery swell.

12. A method for battery management, the method comprising:
    detecting, by at least a sensor coupled to at least a battery, wherein the at least a battery is connected to a vehicle, an internal state datum of the battery;
    transmitting, by the at least a sensor, the internal state datum to a computing device;

receiving, at a computing device, the internal state datum from the at least a sensor;

generating, by the computing device, an alert datum as a function of the internal state datum and at least an alert threshold;

transmitting, by the computing device, the alert datum to a remote device communicatively connected to the vehicle;

receiving, by the remote device, the alert datum from the computing device; and displaying, by the remote device, the alert datum, wherein the vehicle comprises an aircraft, and wherein the at least an alert threshold includes a first alert threshold that results in a command datum for reducing an amount of electrical energy demanded by a propulsor powered by the battery, and a second alert threshold wherein the alert datum generated in response to the internal state datum exceeding the second threshold includes alerting a user of a hazardous battery condition and instructing the user to take an emergency corrective action.

13. The method of claim 12, further comprising:
detecting, by the at least a sensor, an external state datum of the at least a battery, and
transmit, by the at least a sensor, the external state datum to the computing device.

14. The method of claim 13, wherein the external state datum comprises a vibration.

15. The method of claim 12, further comprising generating, by the computing device, the at least an alert threshold.

16. The method of claim 15, wherein generating the first alert threshold comprises:
selecting a training set as a function of the internal state datum, wherein the internal state datum is correlated to an element of model data; and
generating, using a machine-learning process, the first alert threshold based on the internal state datum and the selected training set.

17. The method of claim 15, wherein the second alert threshold comprises multiple levels of threshold.

18. The method of claim 12, further comprising:
generating, by the computing device, the command datum as a function of the internal state datum and the alert datum.

19. The method of claim 12, wherein the alert datum comprises a tactile datum and an audio datum.

20. A system for battery management for a vehicle, the system comprising:
at least a battery connected to the vehicle;
at least a sensor connected to the at least a battery, the at least a sensor configured to:
detect an internal state datum of the at least a battery; and
transmit the internal state datum;
a computing device, the computing device configured to:
receive the internal state datum from the at least a sensor;
generate an alert datum as a function of the internal state datum and an alert threshold;
display the alert datum;
generate a command datum as a function of the internal state datum and the alert datum; and
transmit the command datum to at least a flight component of the vehicle, wherein the vehicle comprises an electric aircraft and the at least a flight component comprises a propulsor of the electric aircraft.

* * * * *